US011095462B2

(12) United States Patent
Toll et al.

(10) Patent No.: US 11,095,462 B2
(45) Date of Patent: *Aug. 17, 2021

(54) SYSTEMS AND METHODS FOR STORING AND SHARING TRANSACTIONAL DATA USING DISTRIBUTED COMPUTER SYSTEMS

(71) Applicant: Nasdaq Technology AB, Stockholm (SE)

(72) Inventors: Johan Toll, Stockholm (SE); Fredrik Sjöblom, Älvsjö (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,254

(22) Filed: Dec. 10, 2019

(65) Prior Publication Data

US 2020/0119933 A1 Apr. 16, 2020

Related U.S. Application Data

(63) Continuation of application No. 16/115,849, filed on Aug. 29, 2018, now Pat. No. 10,541,821, which is a
(Continued)

(51) Int. Cl.
*H04L 29/00* (2006.01)
*H04L 9/34* (2006.01)
(Continued)

(52) U.S. Cl.
CPC ............... *H04L 9/34* (2013.01); *G06F 21/54* (2013.01); *G06F 21/57* (2013.01); *G06F 21/602* (2013.01);
(Continued)

(58) Field of Classification Search
CPC ... G06Q 40/04; H04L 63/0823; H04L 9/0618; H04L 9/34; H04L 9/3247; H04L 2209/56;
(Continued)

(56) References Cited

U.S. PATENT DOCUMENTS

2003/0009413 A1 1/2003 Furbush et al.
2003/0225672 A1 12/2003 Hughes et al.
(Continued)

FOREIGN PATENT DOCUMENTS

WO 2000/26745 5/2000
WO 2001/67409 9/2001
(Continued)

OTHER PUBLICATIONS

International Search Report and Written Opinion issued in Application No. PCT/US16/25189 dated Jul. 1, 2016, 15 pages.
(Continued)

*Primary Examiner* — Don G Zhao
(74) *Attorney, Agent, or Firm* — Nixon & Vanderhye P.C.

(57) ABSTRACT

A computer system that interfaces with a blockchain is provided. The computer system receives match data for a match between a first data transaction request that is associated with a first identifier and a second data transaction request that is associated with a second identifier. A first blockchain transaction is generated based on the match data and stored to a blockchain. At least one further blockchain transaction is generates that splits the match into two different transactions—one between the first identifier and an intermediary and the second between the intermediary. These are recorded to the blockchain via the further blockchain transactions.

20 Claims, 5 Drawing Sheets

Related U.S. Application Data continuation of application No. 15/704,633, filed on Sep. 14, 2017, now Pat. No. 10,084,607, which is a continuation of application No. 15/423,668, filed on Feb. 3, 2017, now Pat. No. 9,794,074.

(60) Provisional application No. 62/291,507, filed on Feb. 4, 2016.

(51) Int. Cl.
| | | |
|---|---|---|
| *G06F 21/54* | (2013.01) | |
| *G06F 21/57* | (2013.01) | |
| *G06F 21/60* | (2013.01) | |
| *G06F 21/62* | (2013.01) | |
| *G06Q 40/04* | (2012.01) | |
| *H04L 29/06* | (2006.01) | |
| *H04L 9/32* | (2006.01) | |
| *H04L 9/06* | (2006.01) | |

(52) U.S. Cl.
CPC ......... *G06F 21/6272* (2013.01); *G06Q 40/04* (2013.01); *H04L 9/0618* (2013.01); *H04L 9/3247* (2013.01); *H04L 63/0823* (2013.01); *G06F 2221/2115* (2013.01); *H04L 2209/38* (2013.01); *H04L 2209/56* (2013.01)

(58) Field of Classification Search
CPC ... H04L 2209/38; G06F 21/54; G06F 21/602; G06F 21/6272; G06F 21/57; G06F 2221/2115
See application file for complete search history.

(56) References Cited

U.S. PATENT DOCUMENTS

| | | | |
|---|---|---|---|
| 2008/0140578 A1 | 6/2008 | Felt et al. | |
| 2010/0228674 A1 | 9/2010 | Ogg et al. | |
| 2011/0231913 A1 | 9/2011 | Feng et al. | |
| 2013/0061049 A1 | 3/2013 | Irvine | |
| 2013/0238478 A1 | 9/2013 | Bruno | |
| 2013/0238903 A1* | 9/2013 | Mizunuma | H04L 63/08 713/176 |
| 2013/0254052 A1 | 9/2013 | Royyuru et al. | |
| 2014/0280476 A1 | 9/2014 | Chiussi et al. | |
| 2014/0310243 A1* | 10/2014 | McGee | G06F 16/27 707/639 |
| 2014/0344015 A1 | 11/2014 | Puertolas-Montanes et al. | |
| 2015/0120567 A1 | 4/2015 | Van Rooyen et al. | |
| 2015/0170112 A1 | 6/2015 | Decastro | |
| 2015/0227897 A1 | 8/2015 | Loera | |
| 2015/0244690 A1 | 8/2015 | Mossbarger | |
| 2015/0262137 A1 | 9/2015 | Armstrong | |
| 2015/0262139 A1* | 9/2015 | Shtylman | G06Q 20/3825 705/37 |
| 2015/0262173 A1 | 9/2015 | Durbin et al. | |
| 2015/0262176 A1* | 9/2015 | Langschaedel | G06Q 20/363 705/71 |
| 2015/0310424 A1 | 10/2015 | Myers | |
| 2015/0324787 A1 | 11/2015 | Schaffner | |
| 2015/0332283 A1 | 11/2015 | Witchey | |
| 2015/0341422 A1 | 11/2015 | Färnlöf et al. | |
| 2015/0348169 A1* | 12/2015 | Harris | G06Q 30/0633 705/26.8 |
| 2015/0356523 A1 | 12/2015 | Madden | |
| 2015/0356555 A1 | 12/2015 | Pennanen | |
| 2015/0363769 A1* | 12/2015 | Ronca | G06Q 40/04 705/64 |
| 2015/0363770 A1* | 12/2015 | Ronca | G06Q 20/10 705/66 |
| 2015/0363772 A1* | 12/2015 | Ronca | G06Q 20/065 705/71 |
| 2015/0363773 A1* | 12/2015 | Ronca | G06Q 20/108 705/71 |
| 2015/0363777 A1* | 12/2015 | Ronca | H04L 9/3236 705/75 |
| 2015/0363778 A1* | 12/2015 | Ronca | H04L 9/3236 705/71 |
| 2015/0363782 A1* | 12/2015 | Ronca | G06Q 20/4016 705/75 |
| 2015/0363783 A1* | 12/2015 | Ronca | G06Q 20/065 705/71 |
| 2015/0363876 A1* | 12/2015 | Ronca | G06Q 40/04 705/37 |
| 2015/0365283 A1* | 12/2015 | Ronca | H04L 67/12 705/71 |
| 2015/0371224 A1* | 12/2015 | Lingappa | G06Q 20/3829 705/71 |
| 2015/0379510 A1 | 12/2015 | Smith | |
| 2016/0012465 A1* | 1/2016 | Sharp | G06Q 20/384 705/14.17 |
| 2016/0027229 A1 | 1/2016 | Spanos et al. | |
| 2016/0028552 A1 | 1/2016 | Spanos et al. | |
| 2016/0078219 A1 | 3/2016 | Hernan | |
| 2016/0080156 A1 | 3/2016 | Kaliski, Jr. et al. | |
| 2016/0086187 A1* | 3/2016 | Joao | G06Q 20/40 705/44 |
| 2016/0092988 A1* | 3/2016 | Letourneau | G06Q 20/363 705/66 |
| 2016/0112200 A1 | 4/2016 | Kheterpal et al. | |
| 2016/0125040 A1 | 5/2016 | Kheterpal et al. | |
| 2016/0162873 A1* | 6/2016 | Zhou | G06F 3/04883 705/67 |
| 2016/0203448 A1* | 7/2016 | Metnick | H04L 9/3247 705/64 |
| 2016/0203572 A1* | 7/2016 | McConaghy | G06Q 20/10 705/58 |
| 2016/0275461 A1* | 9/2016 | Sprague | G06Q 20/0655 |
| 2016/0342988 A1* | 11/2016 | Thomas | G06Q 20/0855 |
| 2016/0344543 A1* | 11/2016 | Alness | G06Q 20/065 |
| 2016/0350749 A1* | 12/2016 | Wilkins | G06Q 20/382 |
| 2016/0358161 A1* | 12/2016 | Cobban | G06Q 20/36 |
| 2016/0365978 A1* | 12/2016 | Ganesan | H04L 9/3297 |
| 2016/0379213 A1* | 12/2016 | Isaacson | G06F 3/048 705/44 |
| 2017/0005804 A1 | 1/2017 | Zinder | |
| 2017/0017954 A1* | 1/2017 | McDonough | G06Q 20/3223 |
| 2017/0017955 A1* | 1/2017 | Stern | H04W 4/024 |
| 2017/0017958 A1* | 1/2017 | Scott | G06Q 20/36 |
| 2017/0048234 A1* | 2/2017 | Lohe | H04L 9/3297 |
| 2017/0048235 A1* | 2/2017 | Lohe | G06Q 20/065 |
| 2017/0076109 A1* | 3/2017 | Kaditz | G06F 16/122 |
| 2017/0083907 A1* | 3/2017 | McDonough | G06Q 20/3829 |
| 2017/0084118 A1* | 3/2017 | Robinson | G07F 17/3241 |
| 2017/0085545 A1* | 3/2017 | Lohe | G06Q 20/065 |
| 2017/0091397 A1* | 3/2017 | Shah | G06Q 50/01 |
| 2017/0091726 A1* | 3/2017 | Morgan | G06Q 20/382 |
| 2017/0091750 A1* | 3/2017 | Maim | H04L 9/30 |
| 2017/0109735 A1* | 4/2017 | Sheng | H04L 9/3297 |
| 2017/0124535 A1* | 5/2017 | Juels | G06Q 20/0655 |
| 2017/0132619 A1* | 5/2017 | Miller | H04L 9/3236 |
| 2017/0132620 A1* | 5/2017 | Miller | H04L 9/30 |
| 2017/0132621 A1* | 5/2017 | Miller | G06Q 20/065 |
| 2017/0132630 A1* | 5/2017 | Castinado | G06Q 20/382 |
| 2017/0134937 A1* | 5/2017 | Miller | G06Q 20/3829 |
| 2017/0140394 A1* | 5/2017 | Cao | H04L 9/3236 |
| 2017/0155515 A1* | 6/2017 | Androulaki | H04L 9/008 |
| 2017/0177898 A1* | 6/2017 | Dillenberger | H04L 9/3236 |
| 2017/0180134 A1* | 6/2017 | King | H04L 63/0823 |
| 2017/0230189 A1 | 8/2017 | Toll et al. | |
| 2017/0359374 A1* | 12/2017 | Smith | G06F 21/6245 |
| 2017/0364552 A1* | 12/2017 | Pattanaik | H04L 9/3297 |
| 2018/0006831 A1 | 1/2018 | Toll et al. | |
| 2018/0101684 A1* | 4/2018 | Murphy | H04L 9/30 |
| 2018/0101914 A1* | 4/2018 | Samuel | G06Q 20/102 |

FOREIGN PATENT DOCUMENTS

| | | |
|---|---|---|
| WO | 2001/86373 | 11/2001 |
| WO | 2008/127428 | 10/2008 |
| WO | 2015/059669 | 4/2015 |
| WO | 2015/085393 | 6/2015 |

(56) References Cited

FOREIGN PATENT DOCUMENTS

| WO | 2015/113519 | 8/2015 |
| WO | 2015/179020 | 11/2015 |
| WO | 2016/008659 | 1/2016 |
| WO | 2016/015041 | 1/2016 |
| WO | 2016/022864 | 2/2016 |
| WO | 2016/029119 | 2/2016 |

OTHER PUBLICATIONS

Nakamoto, S., "Bitcoin: A Peer-to-Peer Electronic Cash System," www.bitcoin.org, 9 pages.

"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.

International Search Report and Written Opinion issued in Application No. PCT/US16/040711 dated Oct. 4, 2016 (14 pages).

"Blockchain Technologies Corp Makes History, 2016 Iowa Caucus Results Forever Documented on Blockchain," https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.

"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.

"Nasdaq Launches Enterprise-Wide Blockchain Technology Initiative," Nasdaq, https://globenewswire.com/news-release/2015/05/11/734456/10133665/en/Nasdaq-Launches-Enterprise-Wide-Blockchain-Technology-Initiative.html, May 11, 2015, 3 pages.

"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.

International Search Report and Written Opinion issued in Application No. PCT/EP2017/052471 dated Apr. 20, 2017.

Nakamoto, S., "Bitcoin: A Peer-to-Peer Electronic Cash System," www.bitcoin.org, Oct. 31, 2008, 9 pages.

* cited by examiner

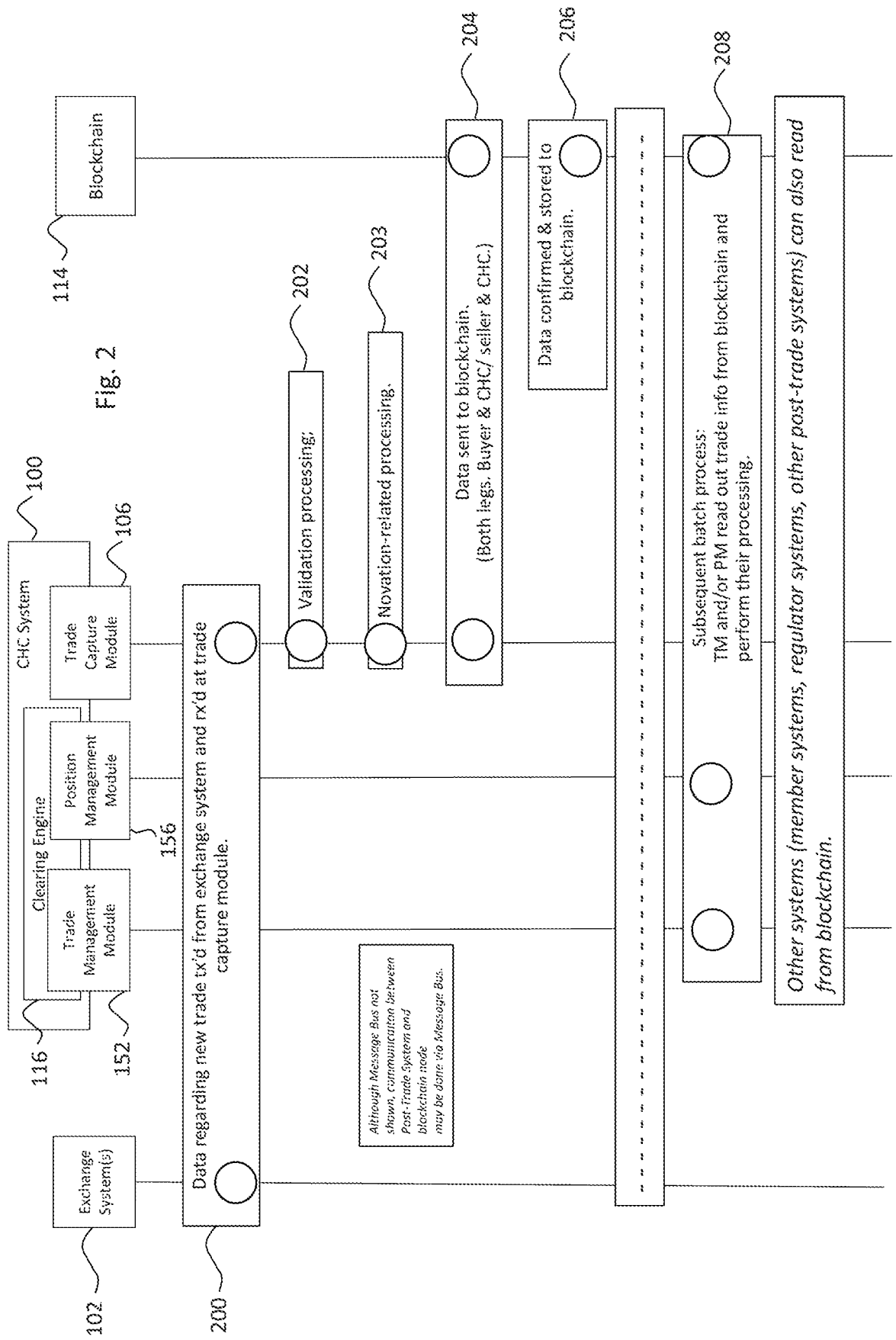

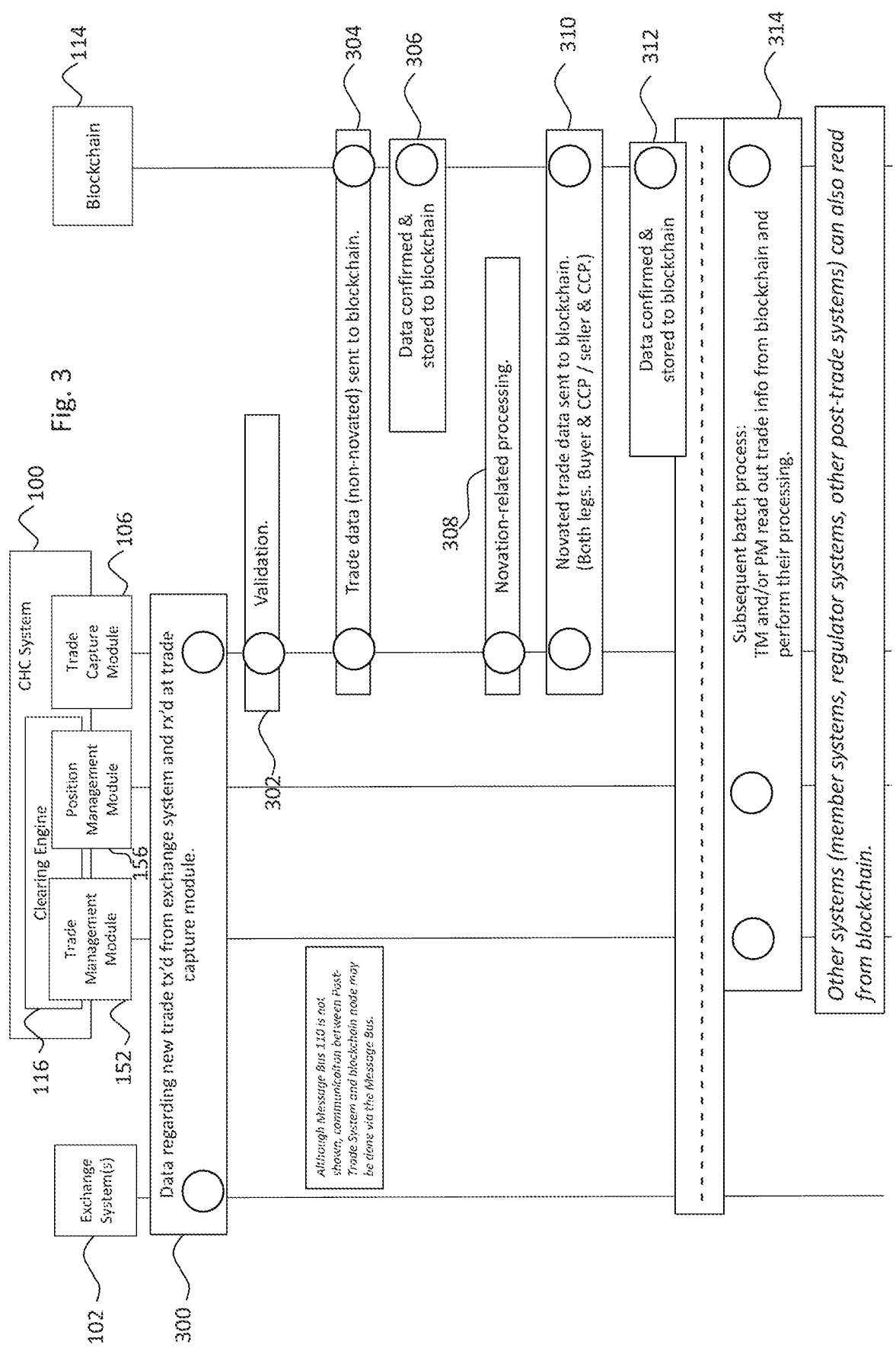

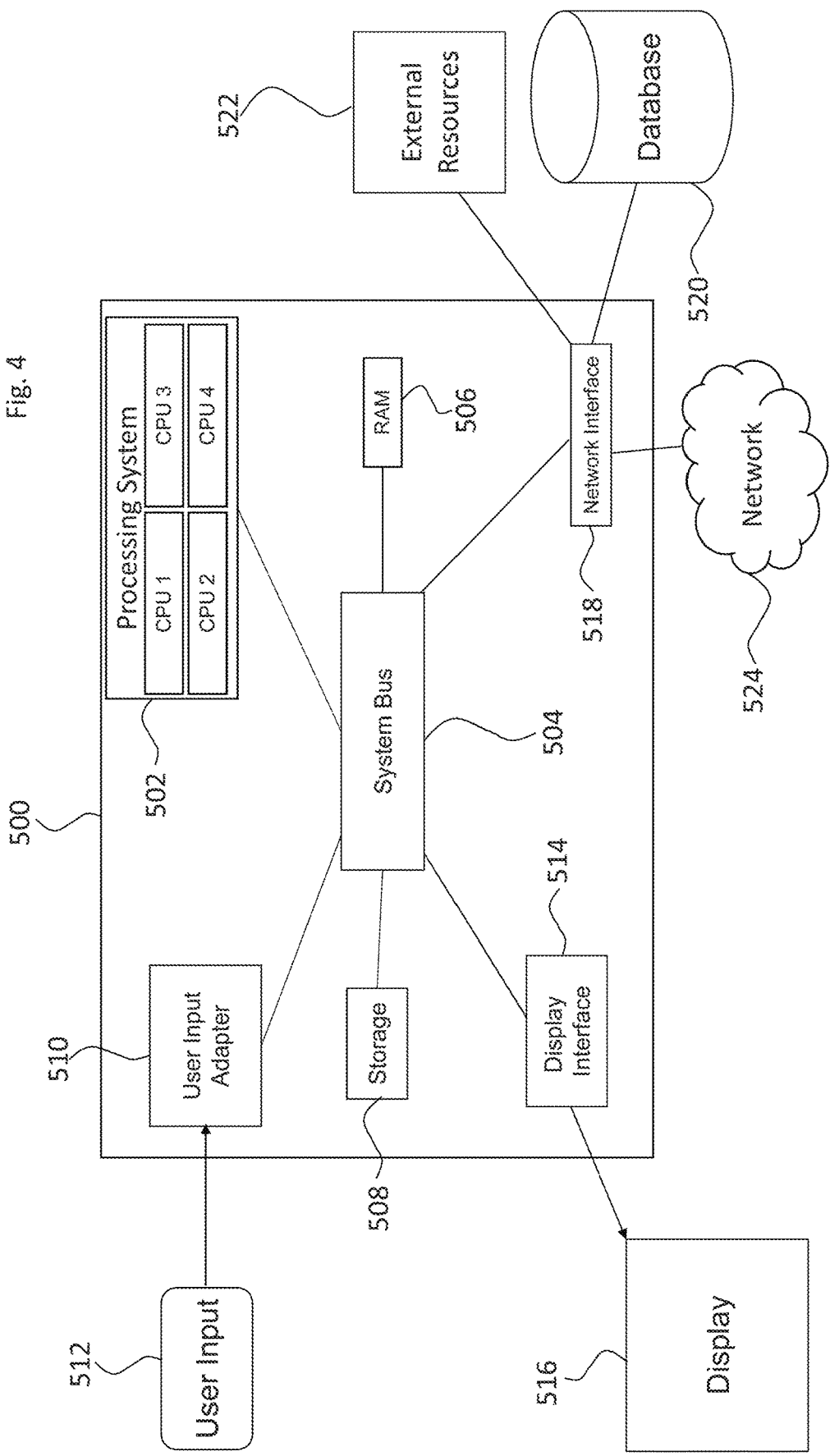

SYSTEMS AND METHODS FOR STORING AND SHARING TRANSACTIONAL DATA USING DISTRIBUTED COMPUTER SYSTEMS

CROSS REFERENCE TO RELATED APPLICATION(S)

This application is a continuation of U.S. patent application Ser. No. 16/115,849, filed Aug. 29, 2018, now allowed; which is a continuation of U.S. patent application Ser. No. 15/704,633, filed Sep. 14, 2017, now U.S. Pat. No. 10,084,607, issued Sep. 25, 2018; which is a continuation of U.S. patent application Ser. No. 15/423,668, filed Feb. 3, 2017, now U.S. Pat. No. 9,794,074, issued Oct. 17, 2017, which claims the benefit of U.S. Provisional Patent Application No. 62/291,507, filed Feb. 4, 2016, the entire contents of each of which are incorporated herein by reference.

TECHNICAL OVERVIEW

The technology herein relates to sharing transactional data using a distributed computer system. More particularly, the technology herein relates to a computer system that interfaces with a distributed computerized ledger system (e.g., a blockchain) to store transactional data that can be accessed by a clearing house computer system or other computer systems.

INTRODUCTION

Computer systems that handle clearing and settlement are important technical components that support the complex process of computerized trading. These systems take millions (or perhaps even billions) of inputs per day and keep track of these inputs to carry out clearing and settlement functionality.

Due to the importance of these processes, the electronic exchange industry and others have devoted a significant amount of resources to developing computer systems (both in terms of hardware and software) that can meet the seeming ever increasing functional needs that stem from regulators, the increasingly interconnected global market, and the like. Similarly, these systems must be updated and maintained to handle the increasing volume of transactions that pass through these systems on a daily basis. However, even with existing advances, current implementations can be prone to slow settlement and clearing times and overall computational inefficiencies in handling such functionality.

It would thus be desirable to improve the speed and efficiency by which clearing, settlement, or both clearing and settlement processes may be performed in a computerized environment. Accordingly, it will be appreciated that new and improved techniques, systems, and processes in this area of technology are continually sought after.

SUMMARY

In certain example embodiments, a computer system is configured to communicate with a distributed blockchain computer system that includes multiple computing nodes, where the computing nodes are configured to store a copy, or a portion thereof, of a blockchain. The computer system is configured to receive a match message from another computer system, such as an exchange. The match message includes details of a match between a first data transaction request associated with a first client identifier and a second data transaction request that is associated with a second client identifier. The computer system includes a processing system with at least one hardware processor. In response to the match message, the processing system generates a first blockchain transaction and transmits that first blockchain transaction to the blockchain for incorporation therein. The first blockchain transaction includes the match data of the match between the first data transaction request and the second data transaction request. The processing system is configured to generate at least one further blockchain transaction that includes data for a first transaction from the first client identifier to an intermediary identifier and details of a second transaction from the intermediary identifier to the second client identifier. The at least one further blockchain transaction is then also submitted to the blockchain.

In certain examples, the computer system is configured to store trades and positions that are based on match messages. In certain instances, the trades and/or positions may be aggregated from the various blockchain transactions that are recorded to the blockchain.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 2 is a signaling diagram that shows at least some part of a clearing process being performed on the clearing computer system by using the blockchain according to certain example embodiments;

FIG. 3 is a signaling diagram that shows at least some part of another clearing process being performed on the clearing computer system by using the blockchain according to certain example embodiments; and FIG. 4 is an example computer system according to certain example embodiments.

DETAILED DESCRIPTION

Figure 1A:
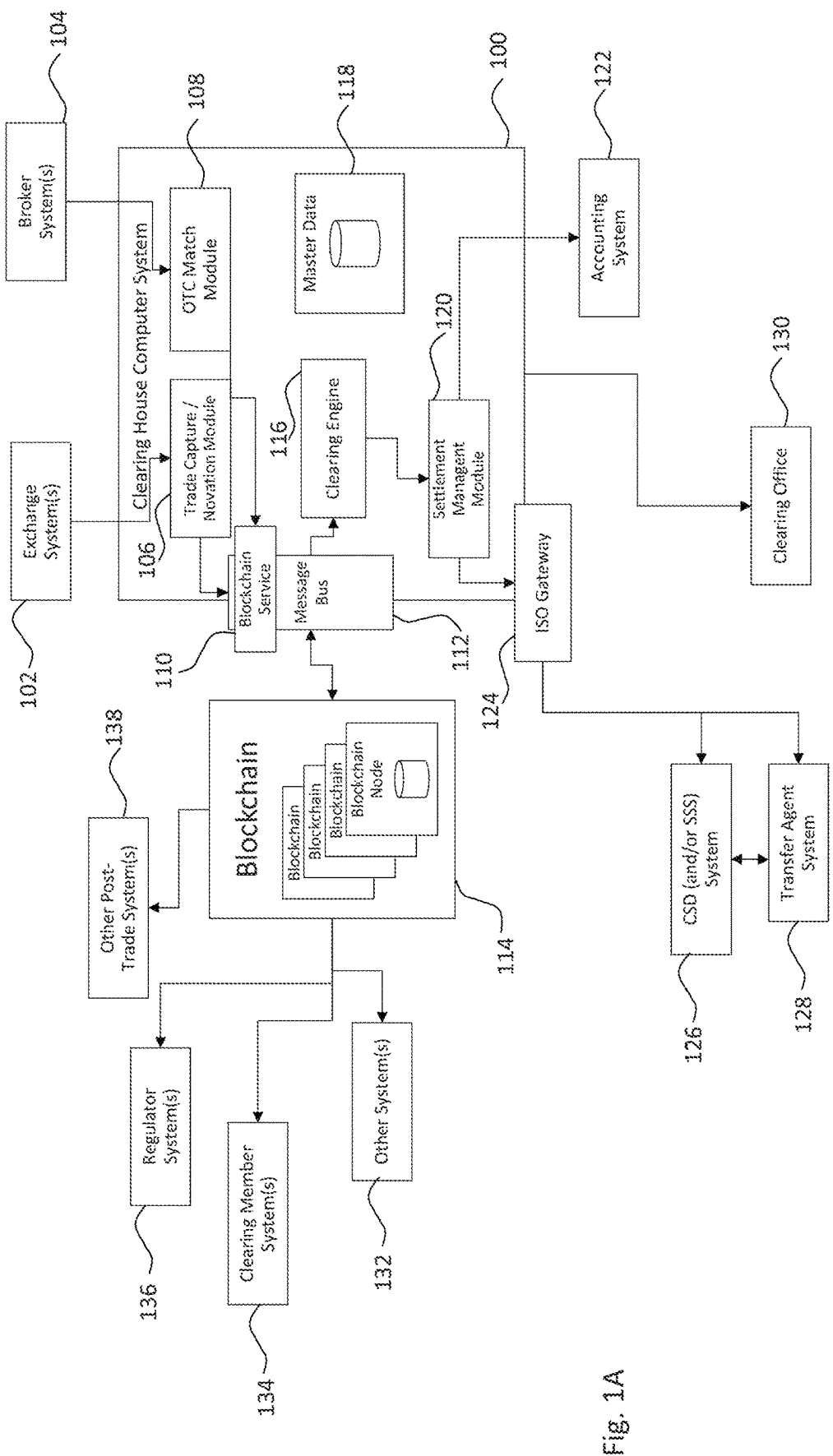
FIG. 1A is a non-limiting example system diagram that includes a clearing computer system that interfaces with a blockchain according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Sections may be used in this Detailed Description solely in order to orient the reader as to the general subject matter of each section; as will be seen in the following text, the description of many features spans multiple sections, and headings should not be read as affecting the meaning of the description included in any section. For example, the inventors contemplate combinations of features that are discussed in more than one of the sections.

Overview

Recently, blockchain technology (sometimes simply referred to as a blockchain) has been developed and has been used in certain digital currency implementations. An example implementation and corresponding blockchain techniques are described in a 2008 article by Satoshi Nakamoto, called "Bitcoin: A Peer-to-Peer Electronic Cash System," the entire contents of which are hereby incorporated by reference. The blockchain is a data structure that stores a list of transactions and can be thought of as a distributed electronic ledger that records transactions between source identifier(s) and destination identifier(s). Every transaction is "to" a destination identifier that is associated with a public/private key pair. In creating a new transaction, outputs from other, prior transactions that are to the "from" address (which may be multiple different addresses derived from the same private key) are used as inputs for this new transaction. The new transaction is then encumbered with the public key associated with the "to" destination identifier. In other words, outputs from prior blockchain transactions are used as inputs for new transactions that are then signed using the public key associated with the destination address. The new blockchain transaction is then submitted to the blockchain. Once on the blockchain multiple such transactions are bundled into a block and the block is linked to a prior block in the "blockchain." Computer nodes of the distributed system then maintain the blockchain and validate each new block (along with the transactions contained in the corresponding block).

As discussed herein, clearing and settlement processes that are performed in conjunction with computerized exchanges are important in today's economy where billions or trillions of dollars (or more) of trades are cleared through clearing house computer systems. The techniques herein make use of blockchain technology to address one or more problems with the conventional database systems that are used in the settlement and/or clearing process.

The clearing process performed by these computer systems generally relates to activities from the time a commitment is made for a transaction (e.g., a match between a buyer-seller) until that transaction (e.g., contract) is "settled." Normally, the clearing time period (the cycle time for completing the transaction) is much longer than the time it takes for the transaction commitment to occur (e.g., the identification of a buy-sell match by an exchange computer system). Clearing itself involves the management of post-trading and pre-settlement credit exposure to ensure that trades are settled in accordance with market rules even if a buyer or seller might become insolvent prior to settlement. Clearing can also include reporting/monitoring, risk margining, netting of trades to single positions, tax handling, default handling, and the like.

The settlement process occurs after clearing and is the time when securities or interests in securities are delivered, usually against (in simultaneous exchange for) the payment of money, to fulfill contractual obligations arising under financial instrument trades. For example, the settlement date for marketable stocks might be 3 business days after the trade is executed, and for listed options and government securities, it might be 1 day after the execution. As part of performance on the delivery obligations entailed by the trade, settlement involves the delivery of securities and the corresponding payment.

Multiple risks arise for the parties during the settlement time and these are managed by the clearing process. Clearing also typically involves modifying the contractual obligations associated with the trade so as to facilitate settlement. A clearing house is a financial entity that provides clearing and/or settlement services for financial, security, and/or commodity transactions. A clearing house intercedes between two clearing entities (also known as clearing members, which may be the parties to a matched trade identified by an exchange) in order to reduce the risk that one (or more) clearing participants fails to honor its trade settlement obligations. A clearing house reduces the settlement risks by (1) netting (netting means to allow a positive value and a negative value to set-off and partially or entirely cancel each other out) offsetting transactions between multiple counterparties, (2) requiring collateral or margin deposits, (3) providing independent valuation of trades and collateral, (4) monitoring the credit worthiness of clearing participants, and in many cases, (5) providing a guarantee fund that can be used to cover losses that exceed a defaulting clearing participant's collateral on deposit. As discussed herein, such functionality may be integrated into a blockchain enabled clearing house computer system.

Once a trade is executed by two counterparties, the trade is provided to a clearing house which then "steps" in between the two original traders' clearing firms and assumes the legal counterparty risk for the trade. In derivatives trading markets, the clearing house interposes between buyers and sellers as a legal counterparty, i.e., the clearing house becomes the buyer to every seller and the seller to every buyer. This process of transferring the trade title to the clearing house is typically called "novation." As a result, there is no need to determine the credit-worthiness of each counterparty, and the only credit risk that the individual participants face is the risk of the clearing house committing a default. Thus, a clearing house assumes the risk of settlement failures and also isolates the effects of a failure of a market participant.

The settlement and/or clearing processes may be implemented in conjunction with blockchain technology. In certain example embodiments, blockchain techniques may be used to store trade and/or position information of a Central Counterparty clearing (CCP) house and trade reporting system (a clearing house computer system). In certain example embodiments, a clearing house computer system (e.g., a computer system that may include one or more computer nodes) is configured (e.g., programmed) to provide clearing services to exchanges and other entities that require such services. The clearing services described herein can apply to all asset classes in both an exchange traded and OTC electronic markets.

The clearing housing computer system interfaces with a blockchain (e.g., plural distributed computer nodes that each possess part or all of a distributed cryptographic ledger) and stores trade and/or position information regarding the trades onto the blockchain. At one or more points in the clearing process, trade information and/or position information of members may be stored onto the blockchain to provide a single distributed record (e.g., a single record that is aggregated from multiple entries to the blockchain) for the cleared trades (and/or positions associated with said trades). In certain example embodiments, multiple different clearing house computer systems (e.g., that may operate in different countries and/or that are traditionally associated with a particular exchange) may access and/or interact with the blockchain.

The blockchain may provide cryptographically safe (e.g., computationally difficult to break) storage to ensure that records added to the blockchain are immutable. The chain of custody for a given trade and how that trade is handled through the clearing process may also be auditable in a public manner (e.g., because one blockchain transaction is linked to a successive blockchain transaction).

Certain example embodiments described herein may incorporate the blockchain techniques discussed in U.S. Application No. 62/270,560 and U.S. Publication No. 2017/0005804, the entire contents of which are hereby incorporated by reference.

Figure 1B:
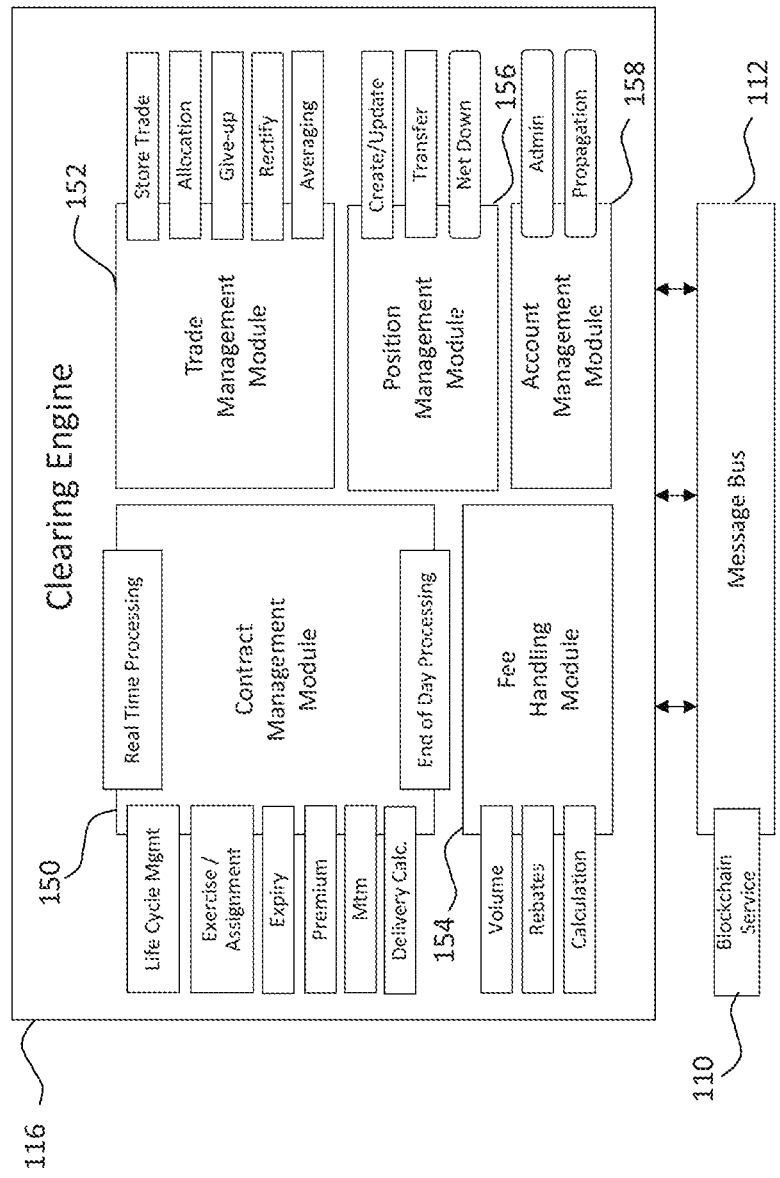
FIG. 1B is a block diagram of an example clearing engine that is included as part of the clearing computer system shown in FIG. 1A.

FIG. 1A shows an example system that includes a clearing house computer system configured to interface with a blockchain. The clearing house computer system of FIG. 1A may include a clearing engine as shown in FIG. 1B. FIGS. 2 and 3 show example processes that may be implemented as part of an example system that includes a clearing house computer system and a blockchain. FIG. 4 shows an example computer system that may implement (e.g., be programmed to) functionality associated with the clearing house computer system, one or more nodes of the blockchain, or other computer systems that are used for the programmatic processes described herein.

DESCRIPTION OF FIG. 1A

By way of introduction, FIG. 1A shows an example system architecture diagram that includes a clearing house computer system 100 configured to interface with blockchain 114.

Exchange systems 102 submit electronic data messages (e.g., a message that is transmitted electronically using wireless or wired networking protocols) that include match information regarding orders that have been matched by the exchange system 102. The electronic data messages are received (e.g., via a transceiver of that system—such as network interface 518) by clearing house computer system 100 and the contents of the messages (e.g., the match or trade information contained therein) is parsed and validated by trade capture and novation module 106. As used herein, modules refer to computer programs (e.g., software) that are implemented on computer hardware (e.g., a hardware processor) or specifically designed hardware circuits (e.g., an FPGA or ASIC). The clearing house computer system 100 then interfaces with a blockchain 114 (or the computer system on which the blockchain is stored) to record transactions thereto. The modules of the system 100 may automatically operate (e.g., without human additional human input once the modules are configured with the system 100) to process and/or generate data that is submitted to the blockchain 114.

Blockchain 114 is a data structure stored on a distributed computer system (a distributed blockchain computer system) that includes multiple "nodes" (e.g., individual computers or processing cores). Each one of the nodes in the blockchain computer system may store a copy, or a portion thereof, of the blockchain 114. The blockchain 114 is made up of a list of transactions (or blocks of transactions) that are all linked together.

The trade capture and novation module 106 is programmed to validate the received trade information by, for example, validating that the counter-parties to the trade are valid parties. In certain examples, this process may include validating the amount of collateral that is recorded for the counter parties. In some instances, this validation may include querying the blockchain 114 to determine if there is a record of sufficient collateral recorded on the blockchain for the counter parties (e.g., the clearing members that are involved with clearing the trade and/or a specific account thereof). For example, every clearing member may have their own digital wallet (discussed below) that is associated with transactions that have already been recorded to the blockchain. The validation process may use the digital wallet of a given clearing member to query that the member has sufficient collateral recorded to the blockchain. The validation may also include validating aspects of the submitted trade information (e.g., that the instrument of the trade is valid that the clearing or exchange members involved with the trade are valid, etc. . . . ). Naturally, other types of features or attributes of the submitted trade may also be validated based on application need.

In certain example embodiments, the data received by the trade capture module 106 may include the data transaction requests (e.g., orders) that have been matched by the exchange system 102. For example, if order A and order B are matched by the exchange system 102, then the exchange system may send an electronic data message that includes the details of orders A and B along with an indication that they have been matched. The trade capture module may thus receive a match message from the exchange that includes or references plural different data transaction requests (orders) that have been matched by the exchange 102. This information may then be used by the system 100 in its further processing and interaction with the blockchain 114.

The received message may also include exchange member identifiers that correspond to the exchange members (e.g., members that are registered with exchange 102) that are participating in the matched trade. In certain instances, every exchange member is also registered as a member of the clearing house computer system. However, there may be instances in which some exchange members are not members of a clearing house. When an exchange member that is also not a clearing member is involved in a matched trade then the non-clearing member must be registered with another clearing member (e.g., the non-member may have an account with a clearing member). Accordingly, each reception of trade information may include details of the exchange members involved in the matched trade and/or clearing members (or accounts thereof) that are to be involved in clearing the trade. Identification of which exchange or clearing member is associated with a newly received trade may be based on identifiers included in data field values of the matched trade or reception of trade information via a specific "port" (e.g., in the case of OTC trades).

In certain example embodiments, the trade information may be stored to the blockchain 114 without first going through module 106. For example, exchange 102 may directly interface with the blockchain 114 and create a transaction "from" the exchange 102 to the CHC system 100. Once the transaction is incorporated into the blockchain 114, the CHC system may read the trade information regarding the match directly from the blockchain 114 and proceed as outlined herein.

After validation, the trade capture and novation module 106 begins the novation process. Novation is a process where the clearing entity (or another entity) steps "between" the two counterparties (e.g., clearing members that are registered with the clearing house computer system or third party entities that have accounts and are registered with a clearing member) and, essentially, assumes the risk of the trade by respectively guaranteeing satisfaction of the trade for the counter-parties. In certain example embodiments, novation may be performed by another system (rather than by the same clearing house computer system). In such a case there may be a blockchain transaction from the system 100 (e.g., a digital wallet associated therewith) that received the trade to a system that handles the novation process (e.g., a digital wallet associated therewith) and back again (if the original system handles the clearing process). In other words, when a match between data transaction requests A (where A is a clearing member) and B (where B is another clearing member) is received, novation is used to generate (e.g., automatically) a match or transaction between A and X (X being the entity performing adopting the novation role— e.g., the entity running system 100) and a match or transaction between X and B.

The trade capture and novation module 106 communicates with message bus 112 to store and/or route the novated trade(s) to blockchain 114 and the blockchain nodes that make up blockchain 114. Message bus 112 may include a blockchain service API 110 that provides an interface for the message bus 112 to blockchain 114. In certain example embodiments, the message bus may include a sequencer service that orders messages that have been generated as part of a distributed computer system (e.g., where the clearing house includes multiple different computer machines). Techniques for such sequencing may be described in U.S. Publication No. 2015/0341422, the entire contents of which are hereby incorporated by reference. In certain examples the message bus 112 may use a network interface (e.g., 518 in FIG. 4) to communicate (using the blockchain services 110) with blockchain 114.

In certain example embodiments, blockchain service 110 may include digital wallet services, key generation, blockchain transaction generation services, and the like. Such services may be provided in the form of a library or the like that may be accessed or used by the message bus or other systems. In certain example embodiments, the clearing house computer system 100 may include wallet memory (e.g., stored in a storage system that may include storage 508 and/or RAM 506 of the example computing device 500 in FIG. 5) that stores digital wallet account information used for interacting with blockchain 114. Digital wallets may be created and/or maintained for exchanges, parties to a matched trade/clearing members (and/or different accounts maintained by clearing members), the clearing house, regulators, banks, in-house systems, and the like.

A digital wallet is software and hardware (or specifically designed hardware) that allows an individual to make electronic commerce transactions that use, for example, a blockchain. The digital wallet is a data structure that can include a private key (e.g., that is only known to the holder of the wallet) and a series of identifiers (sometimes called wallet identifiers, blockchain identifier, or walletIDs herein) that have been generated based on the private key. These identifiers are used to allow other users to "send" transactions, which are recorded on the blockchain, to that identifier. For example, the above novation process creates two blockchain transactions for a trade between party (also referred to as a "clearing member" herein) A and party (e.g., a clearing member) B. A first blockchain transaction may be from the wallet of party A to the wallet of the clearing house. A second blockchain transaction may be from the wallet of the clearing house to a wallet of party B. These transactions may be separately generated and submitted to the blockchain 114. Other types of blockchain transactions may also be used. For example, all transactions that are submitted to the blockchain 114 may be from a private key (e.g., the wallet associated with that key) for the clearing house to the same private key (e.g., the same wallet) associated with the clearing house. In essence, the blockchain may only have one "wallet" that is being used for interacting with the blockchain 114. Other types of implementations may also be possible (e.g., where different clearing houses, or their respective computer systems, use their own keys for a central blockchain). In certain example embodiments, the wallets may be centrally managed by the clearing house computer system 100 so that the parties associated with the trade do not have access to the private keys of the respective wallet. However, the transactions recorded to the blockchain 114 may still be signed by or otherwise associated with the individual wallets of the respective clearing members.

In certain example embodiments, a generated blockchain transaction may include a so-called smart contract. As used herein, smart contracts are computer programs or scripts (e.g., programmatic structures) that are embedded into blockchain transactions and are executed on the blockchain 114 (e.g., distributed system and/or the nodes thereof). A simple example of a smart contract may be software program that automatically sends 10 dollars (in the form of a blockchain transaction) from A (the wallet of A) to B (the wallet of B) when B can run a mile in 6 minutes. In a clearing house example, a smart contract may be used to calculate the total fees for a particular account (or all accounts managed by a clearing member) based on the exposure risk or total of number of transaction performed over a given trading day. Such a smart contract would then automatically generate a transaction from the clearing member to the clearing house for the fee amount.

One potential issue with smart contract is related to the satisfaction of the condition in the contract—or more particularly what entity or individual can provide that condition to the blockchain. In the 6 minute mile example, some entity must provide an event to the blockchain that indicates that B has run a 6 minute mile. However, the blockchain may not have a way to "trust" that event (e.g., did B actually run a 6 minute mile? or did C run it instead?). To address such concerns, the techniques used herein may use a trusted oracle technique where the blockchain (or more particularly the smart contracts on the blockchain) only trust events (e.g., blockchain transactions) from a "trusted" source (e.g., the CHC system 100 or another computer system or source). This may be accomplished by having the CHC system 100 validate and/or sign all of the events that are submitted (e.g., as blockchain transactions) to the blockchain 114. In the running example, the smart contract may thus have additional programmatic logic to only accept events if such events have been signed by the private key of the CHC system 100. Events that are provided by a trusted oracle may include a current margin fee, the current weather, the current price of an instrument traded on an external system, a closing price of an index or other instrument, and the like. In certain examples, multiple trusted oracles may be used, with each trusted source being responsible for certain types of events.

In certain examples, a clearing member may submit a transaction request to the CHC system 100 along with a signed blockchain transaction (e.g., the event information). The CHC system 100 may receive this request and co-sign the blockchain transaction. By co-signing the transaction, the CHC system is validating this event may be "trusted."

In certain example embodiments, the CHC system 100 may create and submit a blockchain transaction, but only sign that transaction over to the relevant party (B in the running example) upon satisfaction of the condition.

In certain example embodiments, each smart contract that is stored into the blockchain may be associated with a blockchain address at which the "event" for the smart contract will be sent. For example, B's mile time may be sent (e.g., as a blockchain transaction) to a specific address that was created for the corresponding smart contract. Once the blockchain 114 receives the event, the smart contract may automatically execute (which may include validating that the event is authentic).

In certain example embodiments, the different stages of the clearing or settlement process may be associated with different digital wallets (and thus different private keys of various entities for unlocking the unspent outputs from those transactions). For example, the reception of a new trade from exchange 102 may cause the generation of a blockchain transaction from a wallet associated with the submitting exchange 102 to a wallet associated with the clearing house computer system 100 or, more specifically, the trade capture module (e.g., wallet of exchange X 102 to wallet of trade capture module 106). Successive blockchain transactions that correspond to the novation process may then be from the trade capture module to another "module" or function that is provided by the clearing house computer system. Such step-by-step blockchain recordation of the various actions taken by the clearing house computer 100 may provide a more transparent and/or easily traceable audit trail or the like.

In certain example embodiments, a clearing member may have multiple different accounts that are each respectively associated with their own respective digital wallet (and corresponding private key). As used herein, functionality and processes that are discussed in connection with a clearing member and/or party may also apply to accounts of a clearing member. A clearing member may have different types of accounts. One type of account may be an account for proprietary or in-house trades for that clearing member (e.g., to clear trades that the clearing member has made). A given clearing member may have multiple such accounts. Another type of account may be a customer type account (e.g., to clear trades on behalf of another entity that is using the clearing member for clearing trades through the CHC system 100). Another type of account may be an omnibus account that is used by multiple different entities. For example, Joe, Bob, and Mark may share an omnibus account with clearing member A. All clearing functionality for these three individuals may share this account and a digital wallet that is associated with this account.

Blockchain service 110 may provide programmatic services (e.g., for other modules of the clearing house computer system or another computer system) to query the blockchain 114 to determine what unspent transactions (e.g., those transaction outputs not used as input for another transaction) are associated with the identifiers of a given wallet. Such software may then present a holistic view of what is "owned" by the holder of the wallet (e.g., a given clearing member or an account for the clearing member). For example, the walletID associated with each party may be used to collate multiple different trades or matches that have been submitted to the clearing house computer system 100. The positions in each of these trades for a given party may be used to determine the total risk exposure (e.g., by summing or netting the trades) for the party and/or the total positions they have with the clearing house computer system. In certain example embodiments, other clearing house computer systems may interact with the blockchain and use the same walletID (e.g. a blockchain address) for a particular party. In certain example embodiments, each trade for a specific party may be associated with a different blockchain address (e.g., that are each tied to a corresponding private key for that specific party). In such instances, even if all of these identifiers are different on the blockchain 114, the CHC system 100 may perform a netting process on all such transactions to determine the overall risk expose for the clearing member that is associated with each of the different blockchain addresses. With such techniques, a party that has trades cleared through multiple different clearing house computer systems (or just those trades for a single clearing house system) may have their total position or risk exposure determined through corresponding blockchain transactions that are on the blockchain 114. Since all of the transactions for a given party refer to the same digital wallet (e.g., are all tied to the same private key) such summations may be made by querying the blockchain 114.

In certain example embodiments, the blockchain services 110 are provided on a separate computer system and are associated with a blockchain 114 (e.g., a group of blockchain nodes) that are used by multiple different clearing house computer systems. Access to blockchain services 110 in such an implementation may be provided using remote procedure call (RPC) conventions, service orientated architecture (SOA), or other mechanisms that allow remote computer systems to invoke or request services from remote resources. In such instances, the separately provided blockchain service may store and/or maintain wallets for exchanges, clearing houses, clearing members (and accounts thereof), settlement services, parties to trades, brokers, etc. . . . . Multiple different clearing house systems (e.g., system 100 and other systems) may access blockchain services 110 and write/read to/from the blockchain 114.

It will be appreciated that while a given party may have one private key that more than one public blockchain identifier may be used in connection with that private key (and the party associated therewith). In other words, each time a new blockchain transaction (or each trade that results in multiple blockchain transactions) is generated, the blockchain identifier associated with that trade may, from the point of view of a passive observer, be unique (e.g., because the ID is hashed from the private key and other, perhaps, random data to create a unique blockchain identifier). However, the blockchain services 110 may allow for certain authorized parties (e.g., regulators, auditors, other clearing members) to see all of the transactions that are associated with a given party. For example, the system 100 may hold all of the digital wallets (and private keys therein) for all of the clearing members. Thus, even if the total exposure for a given member is unknown to the general public (or other clearing members), an authorized party (e.g., a regulator) may be granted access to the digital wallet of a clearing member to see all of the blockchain transactions that are associated with that digital wallet.

In certain examples, some members or other users of the blockchain 114 may have direct access and others may not. For example ordinary clearing house members may interact with the blockchain through system 100 and other entities (e.g., a regulator) may directly access the blockchain 114 without relying on system 100. This may allow regulators to run or extract reports direct from the source (i.e., the blockchain) without using the clearing house computer system as an intermediary. In certain example embodiments, direct read access to the blockchain 114 may be granted to clearing members. However, only system 100 may be allowed to write to the blockchain. This may be enforced through the use of smart contracts include with the generated and submitted blockchain transactions that all require a signature from the private key of the system 100 in order to be validated.

In certain example embodiments, a digital wallet and its contents (e.g., private key and generated identifiers) are stored on the systems that are represented in the blockchain. For example, exchange system 102 may store its own wallet information and may use that wallet information to generate and submit blockchain transactions directly to the blockchain 114 for verification thereon. In certain example embodiments, parties to a trade may also possess or maintain control over their private keys and wallets. Various elements of the wallet may thus be provided on different computer system (e.g., a mobile device of a user, a user's desktop computer system, clearing house computing system 100, a third party system such as a cloud based system that stores digital wallets and the information therein).

Once trade information is stored to the blockchain 114, then it may be accessed by clearing engine 116 via message bus 112. As one non-limiting example, clearing engine 116 may be associated with a wallet and may "listen" to the blockchain via the message bus for transactions that are associated with its corresponding walletID (e.g., transactions that have been signed with the public key associated with the walletID of the clearing engine and can be "unlocked" using the private key of the wallet). Once a transaction is associated with the wallet of clearing engine 116 (or the clearing engine otherwise is informed or recognizes that a blockchain transaction includes trade data that is to be cleared) it continues the clearing process as discussed in greater detail below in connection with FIG. 1B.

Settlement management module 120 is a module that handles the post-clearing processes of initiating settlement and communicating with a central securities depository 126. This is accomplished through ISO gateway 124 that is a port based interface to the CSD system and the transfer agent system 128. In certain example embodiments, an account system 122 and clearing office 130 also interface with the settlement management module.

The clearing house computer system also includes an internal database 118 (e.g., database 520 in FIG. 4). Database 118 may be a traditional relational or centralized database that stores information that is not submitted to the blockchain. This may include, for example, wallet information, account information, business process rules, and other information that is not stored on the distributed ledgering system of the blockchain 114. In certain examples, master data 118 may keep a copy of data that is submitted to the blockchain for verification.

Clearing housing computer system 100 may also receive OTC (over-the-counter) trades from broker computer systems 104. In certain instances, these types of matches or trades may be more complex and may require additional validation (or clearing) processing by the clearing house computer system 100. In any event, such trades are received by OTC match module 108 that may perform validation and/or novation before submitting blockchain transactions to the blockchain 114 for incorporation therein. Such trades, like trades from the exchanges, may then be picked up or retrieved by the clearing engine and cleared according to a clearing process.

In certain example embodiments, blockchain 114 may be directly accessed (e.g., using an appropriate blockchain protocol) by other systems 132, clearing member systems 134 (e.g., computer systems that are directly controlled by entities that are registered with the CHC system 100 as members), regulator systems 136, and/or other post-trade systems 138. Each of these systems may access blockchain 114 directly, and/or via blockchain services 110. Other clearing house members and/or banks may read the blockchain 114 for the transactions thereon. Such an approach may alleviate costly replication processes because the blockchain is the central or golden record for the trades and positions. In certain instances, when clearing house members access trade information stored on the blockchain, they may end up bypassing the traditional proprietary gateways and protocols used in other types of clearing house computer system implementations.

DESCRIPTION OF FIG. 1B

FIG. 1B is a block diagram of a clearing engine 116 that may be included as part of clearing house computer system 100 of FIG. 1A according to certain example embodiments.

Clearing engine 116 may include one or more sub-modules that are respectively responsible for handling different aspects of the clearing process. In certain example embodiments, this may include, contract management module 150, trade management module 152, fee handling module 154, position management module 156, and account management module 158. As discussed above, the clearing engine 116 may interface with a blockchain via message bus 112 and blockchain services 110. In certain example embodiments, the clearing engine 116 interacts with the message bus without "knowing" (e.g., being programmatically aware) of the blockchain. In other words, message bus may encapsulate access to the blockchain through one or more application programming interface (API) calls that are generically provided to the clearing engine 116. For example, the message bus may simply notify the clearing engine 116 that a trade is ready to be cleared and provide that trade data to the clearing engine 116. Thus, in certain non-limiting example embodiments, from the perspective of the clearing engine 116, the trade details could be stored in a traditional database, flat file, or the blockchain 114. The encapsulation of the blockchain services 110 by the message bus 112 may allow existing clearing systems to be "retro-fitted" with a blockchain implementation that either replaces or runs alongside more traditional storage techniques for clearing and settlement.

Contract management module 150 may include functionality for handling contracts/trades over the lifecycle of the contract/trade. This may include, for example, a regular equity trade, derivative, or option. In certain instances (e.g., for derivatives, options, futures, etc. . . . ), such contracts may exist over a number of days, months, or years. Contract management module 150 may then provide real time processing and end of day processing. The contract management module 150 may also provide delivery calculations (e.g., a number that is calculated based on the maturity of the contract and/or yield), checking for expiration, assignments, general management associated with the contract (e.g., ensuring the terms of the contract are being met), mark-to-market checking and calculations, calculation of premiums, and the like.

Trade management module 152 provides functionality for moving trades between accounts (which may be associated with members). This may include give-ups (e.g., moving positions between different accounts or even different clearing members), allocations, averaging, rectifying (e.g., canceling a trade), and the like. In certain examples, a give-up may be used to, for example, sent trades to a different clearing member (or account thereof). In certain instances rectifying (e.g., cancelation) a trade may occur by generating a new blockchain transaction that "sends" the trade to a cancel blockchain address (e.g., such that positions for that trade are no longer associated with a given clearing member account). In certain examples, this functionality may be handled within a smart contract and thus this processing may be offloaded to the blockchain 114

Fee handling module 154 may include functionality for tracking a volume of trades that have been handled on a per member (or per exchange basis). This may include the calculation of rebates and/or fees associated with clearing trades for a given client (sometimes also referred to as members herein) or the like. In certain examples, such calculations may be performed via a smart contract that automatically generates a fee transaction (e.g., from the clearing member to the CHC system 100). For example, the calculations may be performed at the end of the day.

Position management module 156 provides functionality that is used to help in clearing a trade. That can include creating or updating positions that have been taken by a given client, transferring assets or positions from one client to another and netting multiple different trading positions (e.g., to thereby reduce exposure or collateral requirements for a given client). In certain example embodiments, transfers between different accounts (e.g., digital wallets) may be further enforced by a smart contract that is embedded with the transactions. The smart contract may require, for example, that a private key associated with the CHC and a private key associated with the account from which the transfer is occurring both be used. In another example, a smart contract may be used to control that only the CHC system may initiate a transfer. Both of these options ensure that transfers may first be validated by the CHC system 100.

In certain example embodiments, a position of an account with a clearing member may be updated to include additional information. For example, the outputs of a first blockchain transaction may be used as inputs (with other data—perhaps the outputs from yet other blockchain transactions) in a new blockchain transaction Account management module 158 provides account management services for clients of the clearing house computer system 100. In certain examples, the account management module 158 may be used by members to access their digital wallets that are used to access the blockchain 114.

In certain example embodiments, there may be more or less functionality provided by an example clearing engine 116.

DESCRIPTION OF FIGS. 2 AND 3

FIGS. 2 and 3 show two different example processes that may be implemented as part of an example system that includes a clearing house computer system 100 and a blockchain 114. In the process shown in FIG. 2, validation and novation occur before interaction with the blockchain 114. In the process shown in FIG. 3, interaction with the blockchain occurs both before the novation process and after the novation process.

Referring to FIG. 2, in step 200 exchange system 102 transmits data regarding a match or trade to the clearing house computer (CHC) system 100 (which may sometimes be referred to as a post-trade computer system). In certain examples, trade or match data may be received via OTC match module 108 (as discussed herein). The received data may include the amount of the trade, the parties involved in the trade (e.g., the client, account, or member identifiers for the exchange members, the clearing house members, or both that are involved in the trade), the price of the trade, the particular instrument that is being traded, requirements for clearing the trade, and other data that may be used or stored by the CHC system 100. This information is received by the trade capture module (TCM) 106 (or the OTC match module 108) of the CHC system 100. In certain example embodiments, the two sides of a received trade may be the inputs for the blockchain transaction that is initially submitted. The outputs may then represent the positions of each of the accounts. In certain examples, more than one output may be used. Each output may be signed by a corresponding private key associated with the account for that matched trade.

After reception of the trade details by the TCM 106, the trade is validated in step 202. This validation may include, as discussed herein, checking that the parties involved are valid, have sufficient collateral for the trade, and other details regarding the trade. In the case of OTC trades submitted from brokers (e.g., via OTC module 108), this may be a more complex task due to the somewhat adhoc nature of how trades may be formulated in OTC environment.

In any event, once a trade has been validated in step 202, the novation process begins at step 203. The novation processing includes splitting the submitted trade into two different legs.

Splitting the received trade into two separate transactions results in an automatically generated first transaction from A to X (e.g., from the identifier for member A to the identifier for X—the CHC system 100) and an automatically generated second transaction from X to B (the identifier for X to the client identifier for B). Each of these transactions is sometimes referred to as a "leg." For example, if "A" offered to sell 100 of XYZ @ 99 and "B" offered to buy at that price (and exchange 102 identified a match), then the novated transactions would be from A to X and from X to B. Instead of A selling to B, A sells to X (the CHC) and then X sells to B. In this way "X" assumes the risk associated with the original transaction by essentially guaranteeing A and B that they will get what they agreed to—even if the other member is unable to fulfil the terms of the transaction.

In step 204, the two legs are submitted to the blockchain 114. In certain example embodiments, both legs are part of one blockchain transaction that is between, for example, a blockchain account (e.g., a digital wallet) of the exchange (or broker) and the clearing house computer. For example, the exchange 102 may have a digital wallet and a blockchain identifier from that wallet may be used in the generation of a blockchain transaction that is "to" the system 100. As used herein, when a blockchain transaction is from one entity or system (e.g., exchange 102) to another entity or system (the CHC system 100) it is from blockchain identifiers associated with those systems (e.g., each system or entity may have a separate digital wallet).

In other example embodiments, both legs are submitted to the blockchain 114 as part of separate blockchain transactions. For example, the transaction from A to X may be used to generate a first blockchain transaction that is from the digital wallet associated with member A to the digital wallet associated with X (e.g., system 100). Accordingly, this first blockchain transaction may be signed with the public key of X. A second transaction may also be generated that is "from" X to B (and thus signed by the public key of B). In certain instances, the input of the second blockchain transaction may be the output of the first blockchain transaction. In other examples, the first and second blockchain transactions may be separate. In yet other examples, the blockchain transactions that are recorded to the blockchain may be from an identifier associated with the CHC system 100 to that same identifier.

In any event, once the trade data has been submitted to the blockchain 114, then in step 206, blockchain 114 (or the nodes therein) confirms, verifies, or otherwise validates the submitted blockchain transaction. This is accomplished by nodes of the blockchain "mining" the submitted blockchain transaction (or a block that is associated with the transaction).

Each transaction (or a block of transactions) is incorporated, confirmed, verified, included, or otherwise validated into the blockchain 114 via a proof-of-work mining process. The mining process may involve solving a computationally difficult problem that is also easy to verify. For example, each node may attempt to "mine" a solution to the hash of a block or a transaction. Hashes (also referred to herein as "hash functions," "cryptographic hash functions," and the like) include functions that map an initial input data set to an output data set. The output from a hash function may be referred to herein as a "hash identifier," "hash value," "hash data set," or simply, a "hash"). Generally, the output values from a given hash function have the same fixed length. And if the same hash function is used on the same input data it will result in the same output value. With some hash functions (including those used in the context of blockchain techniques and/or the subject matter of this application) the input value is computationally difficult to determine when only the output value is known. In certain examples, the input value for the hash function is supplemented with some additional random data. For example, an input value of "blockchain" for a hash function may include addition random data such as three random characters. Accordingly, the data value that is hashed may be "blockchaina5h" instead of simply "blockchain." The additional random data is sometimes called a "nonce."

In order to validate a new block into the blockchain (or one transaction), the proof of work process (e.g., the hash operation process) that is performed may include finding an input hash value (i.e., the block) that results in an output hash value that meets a given condition. As the data related to the blockchain transactions in the block are fixed, miners (e.g., computer nodes that all or part of the blockchain) modify the nonce value that is included as part of the block being validated until the output value of the hash function meets the given condition. For example, a target output value may have 5 zeros as the first four numbers of the hash. This is a problem that may be computationally difficult to determine, yet relatively easy to verify.

Returning to FIG. 2, at step 208, after submitting the blockchain transaction in step 206, the system 100 (e.g., the trade management module 152 and/or the position management module 156) executes a batch process that reads out the data regarding the trades stored on the blockchain 114. In certain example embodiments, the batch process may include netting or summing the positions of the various accounts (e.g., at the end of the trading day). For example, if an account is long 100 million for one trade and short a 100 million for another trade that would mean that the collateral needed for that account may be relatively low (as the two trades effectively cancel each other out). However, if an account is short 100 million on two separate trades there may be larger collateral needs for that account.

In certain examples, the batch process may be part of a smart contract that is run at the expiration of each trading day and determines the net positions of each account for each member. Based on this calculation the smart contract may also generate and submit further blockchain transactions. For example, a further transaction may cause an amount to be transferred from a first account to a second account (e.g., to handle increased collateral requirements or to reduce such requirements). In certain examples, further transactions may also require the signature (e.g., approval) of the clearing member that is involved in the transfer. This multi-signature requirement for further transactions may facilitate trust in the system as any transfer would need to be approved by both the CHC system 100 and the clearing member (or the account thereof).

At this point, the information on the blockchain 114 may now be considered immutable (e.g., it is mathematically extremely difficult to change as other transactions may be dependent on the transaction submitted in 206). In certain example embodiments, additional or subsequent blockchain transactions may be generated and submitted to the blockchain based on this processing. For example, as part of the life cycle maintenance of a future or options contract, the details of the contract may also be updated and stored to the blockchain 114. These changes may then create an immutable record (e.g., an audit trail) showing how the contract has changed or adjusted over the period of the contract (e.g., reflecting changed premiums or delivery calculations, etc. . . . ). In certain example embodiments, this may occur on an as needed or end-of-day (or other timeframe) basis.

In certain example embodiments, any change to a contract (whether a simple equity trade or a more complicated derivative future) may be recorded onto the block chain.

In certain example embodiments, and throughout the process of the CHC system 100 interacting with the blockchain 114, other systems (member systems, regulator systems, other post-trade systems) may read the transactions that have been stored to the blockchain. In certain example embodiments, the CSD system 126 may interact with the blockchain 114 (or another blockchain) to record an immutable record of ownership for the asset subject to the trade.

FIG. 3 is an alternative process of handling a trade that has been received from an exchange (or broker). Step 300, like step 200 in FIG. 2, includes the reception of trade details. In step 302, the TCM validates the trade. However, unlike in FIG. 2, the validated trade data is sent to the block chain in step 304 (e.g., before the novation process). Specifically, the CHC system 100 generates a blockchain transaction (or the blockchain services 110 generates such a transaction) and the initially validated trade is sent to the blockchain 114 for storage therein. It should be noted that the trade information submitted to the blockchain 114 at this point is before the novation process. This extra interaction with the blockchain 114 may be beneficial as a more complete record of the handling the incoming trade by the clearing house computer system 100 may be recorded to the blockchain 114. The generated and submitted blockchain transaction may be from the exchange to the CHC system 100.

In step 306, the blockchain transaction submitted in step 304 is verified by the blockchain 114 (as discussed above in connection with FIG. 2). In step 308, after (or even while) the blockchain transaction in step 306 is being verified, the TCM module 106 begins the novation process in step 308. As discussed above, the novation process creates two new "legs" for the transaction.

In step 310, both legs of the novated trade are sent to the blockchain 114 where they are verified. As discussed above, there may be a blockchain transaction for each leg that is created and submitted or both legs may be included in a single blockchain transaction that is submitted and verified by the blockchain 114. In any event, in step 312, the submitted blockchain transaction(s) are verified (e.g., via mining) by nodes on the blockchain.

Step 314, like step 208 in FIG. 2, the data (which may have been verified at this point by the blockchain 114) is read out and the clearing process continues with the trade management module 106 and position management module 156 operating on the data that has now been permanently stored to the blockchain. As with FIG. 2, other systems may also access the blockchain to view details regarding the trades.

In certain example embodiments, exchange systems and/or broker systems may directly submit trades to the blockchain 114. For example, a blockchain transaction from the exchange 102 to the clearing house computer system 100 may be submitted to the blockchain for inclusion therein. The trade capture module 106 of the clearing house computer system 100 may then read this information (e.g., because the key to unlock the transaction that is holding the trade details on the blockchain 114 is the private key that is part of the wallet associated with the clearing house computer system 100 or other wallet associated with the trade). The trade details may then be processed and/or validated as described herein. If there is a validation issue with the trade, the validation issue may be written to the blockchain (e.g., much like an error code is written to a log file or the like).

In certain example embodiments, the blockchain may be privately hosted (e.g., where all member nodes are run and provided by the same entity or a controlled group of entities). In certain example embodiments, the blockchain may be a publically provided blockchain, such as the one provided by the bitcoin network. It will also be appreciated that the term "blockchain" is meant to include the distributed system that makes up the bitcoin network and other cryptographically-based distributed ledgers. Thus, the term blockchain as used herein is not confined to the so-called blockchain that is only used for the bitcoin cryptographic currency.

In certain example embodiments, a variation of what is shown in FIG. 3 may be performed, involving an OTC trade instead of a trade matched on an exchange system. In such an embodiment, instead of step 300 involving an exchange system and the trade capture module 106, an analogous step may be performed wherein an OTC trade system (such as broker system 104) transmits trade data (having the same or similar attributes to the trade data noted above with respect to step 300) to the OTC match module 108 in the CHC 100. Then, the remainder of the method shown in FIG. 3 may be performed, with the actions shown in FIG. 3 performed by the trade capture module 106 instead being performed, mutatis mutandis, by the OTC match module 108. As explained above, in certain instances, the novation and/or validation process may be more complex in the case of OTC trades.

DESCRIPTION OF FIG. 4

FIG. 4 is a block diagram of an exemplary computer system 500 according to certain example embodiments (e.g., the clearing house computer system 100, a regulator system 136, an accounting system 122, a computer system running blockchain services, a CSD system 126, exchange system 102, broker systems 104, accounting system 122, etc. . . . as described in connection with FIGS. 1a and 1B or a computer node that is part of a distributed computer system used to process and maintain a blockchain, etc. . . . ). Computer system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. A storage system may comprise cache memory that are on the computer chip of CPU 1, RAM 506, storage 508, hardware registers, external systems 522, and the like.

In certain example embodiments, the processing system 502 is programmed (e.g., via a series of program instructions) to carry out the process and/or one or more of the steps/actions shown in FIGS. 2 and/or 3 (e.g., the system may be programed such that either process may be implemented depending on design needs for a particular trade, exchange, or other variable). In certain example embodiments, the processing system is programmed to achieve the results shown in FIGS. 2 and/or 3. In certain example embodiments, the processing system is programmed so that one core (e.g., CPU 1) handles all processing for trade capture and novation, while another core (e.g., CPU 2) handles blockchain services and/or mining, while another core runs the clearing engine or one of the modules thereof.

In certain example embodiments, the processing system is programmed to implement functionality associated with clearing office (e.g., a user interface that is used to interact with the CHC system 100). This may include a web server that serves up html and other web content to computer systems or include, software interfaces (e.g., APIs) that receive remote procedure calls or service invocations from remote computing devices. Additional functionality may also be programmatically implemented for an example computer system.

The system bus 504 communicates with user input adapter 510 (e.g., PS/2, USB interface, or the like) that allows users in input commands to computer system 500 via a user input device 512 (e.g., a keyboard, mouse, touch panel, or the like). The results of the processing may be displayed to a user on a display 516 (e.g., an LCD) via display interface 514 (e.g., a video card or the like). In certain example embodiments, commands to computer system 500 may be provided via network interface 518 (as discussed above). In certain example embodiments, representations a document or content that is part of a job may be displayed on display 516 or a display that is communicatively coupled to computer system 500 via network interface 518. In certain example embodiments, content for a job being managed by the information system 100 may be directly entered via user input device 512. Certain examples embodiments may include one or more user input adapters (e.g., a keyboard and mouse). Certain example embodiments may include one or more output devices (e.g. multiple monitors and/or multiple display interfaces).

The computer system 500 may also include a network interface 518 (e.g., a transceiver) to facilitate wired (e.g., Ethernet-802.3x) and/or wireless communication (WiFi/802.11x protocols, cellular technology, and the like) with external systems 522, databases 520, and other systems via network 524. External systems 522 may include other processing systems, systems that provide third party services, etc. External systems 522 may be client devices or server systems.

External systems 522 may also include network attached storage (NAS) to hold large amounts of data. External systems, along with the internal storage and memory, may form a storage system for storing and maintaining information (e.g., blockchain, account data, wallet information, etc. . . . ). Such a system may communicate with users and/or other computer systems. The database 520 may include relational, object orientated, or other types of databases for storing information.

In certain example embodiments, the storage system of the computer system may store instructions that cause one or more processors (e.g., the processing system) of the computer system to perform each or any combination of actions described herein as performed by, for example, an information system, a client computer system, and/or an external computer system.

In certain example embodiments, a method can include each or any combination of actions described herein as performed by an computer system, including the computer systems of FIGS. 1A and 1B. In certain example embodiments, a method can include each or any combination of actions described herein as performed by a user device (which may include exchange systems, broker systems, and/or clearing member systems).

In certain example embodiments, a computer system includes each or any combination of the components shown as included in the exemplary computer system 500 of FIG. 4, where the each or any combination of the components are configured to perform the method(s) in the above paragraph(s) or the processes, steps, and/or actions shown in FIGS. 2 and/or 3.

In certain example embodiments, a processor is configured or programmed to perform the method(s) above and/or the processes, steps, and/or actions shown in FIGS. 2 and/or 3.

In other words, the processes, techniques, and the like, described herein (for client devices, server, computer system, distributed computer system, and/or controller systems) may be implemented on a computer system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 1A or 1B may be included into one cohesive physical structure (e.g., such as a tablet device). The components and functionality shown in FIGS. 1A-3 may be implemented on or in conjunction with the example computer system shown in FIG. 4 (e.g., to thereby create a specific purpose computing machine).

Individual function or process blocks are shown in the figures. Those skilled in the art will appreciate that the functions of those blocks may be implemented using individual hardware circuits, using software programs and data in conjunction with a suitably programmed hardware, using applications specific integrated circuitry (ASIC), and/or using one or more digital signal processors (DSPs). The software program instructions and data may be stored on non-transitory computer-readable storage medium and when the instructions are executed by a computer, or other suitable hardware processor, control the computer or hardware processor to perform the functionality defined in the program instructions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM or cache to a processor; (ii) or instructions for a process may be stored in an instruction register and loaded by a processor. Instructions and/or data may be carried or delivery over other types of transmission mediums (e.g., wire, wireless, optical, etc.) and/or transmitted according to numerous formats, standards or protocols, such as Ethernet (or IEEE 802.3), SAP, ATP, Bluetooth, and TCP/IP, TDMA, CDMA, 3G, etc.; Such transitory signals may be coupled to non-transitory media (e.g., RAM, cache, hard drive, a receiver, registers, etc. . . . ), thus transitory signals will be coupled to non-transitory media. The transitory and non-transitory signals, instructions, and/or data, may be encrypted to ensure privacy or prevent fraud in any of a variety of ways well known in the art.

Technical Advantages of Described Subject Matter

In certain example embodiments, a clearing housing computer system interacts with a blockchain. The system advantageously provides cryptographically safe storage and immutability for the records that are stored on the blockchain. The system allows for a complete history of transactions (e.g., a chain of transactions). In certain example embodiments, cryptographic signing may be required or used to facilitate the transfer or issuance of assets.

The use of the blockchain allows for consensus confirmation (e.g., via mining) of submitted transaction before they may be considered "committed" to the cryptographic ledger that is represented by the blockchain. The records on the blockchain may then provide a shared view of trades and/or positions derived from a marketplace across all business stakeholders (e.g., clearing house members, regulators, etc. . . . ). In certain example embodiments, the use of the blockchain to store clearing-related trade information may provide for an agreed upon view (or record) of trades and positions between multiple different clearing house computer systems. Such an implementation may thus decrease the cost of replication across databases (of clearing house computer systems).

When conventional database techniques are used in a clearing and/or settlement systems, it may be difficult or infeasible to efficiently distribute the database across the multiple different parties that are involved in the process. In particular, when databases are distributed in such a manner reconciliation may become a problem (e.g., keeping the database in sync with each other). In such distributed environments it can be difficult to determine which database has the "correct" version of the data if there is a discrepancy between the different database locations. The problem becomes even more evident where there are multiple different entities that must interact with the database. Signing of transactions may not be performable in an STP manner and/or a consensus process for confirmation of those transactions across several parties may be infeasible (if not outright impossible). One or more of these technical issues may be addressed by storing objects (e.g., asset classes, trades, positions, collaterals, etc. . . . ) on a blockchain (e.g., within the same ledger).

The technical features described herein may thus improve the security, verifiability, and reliability of trade information for one (or more) clearing houses.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

For each embodiment described herein where blockchain technology is used for a particular purpose or feature, it should be understood that blockchain technology is just one example of a technology that may be used for such purpose/feature; in various other embodiments, other types of distributed ledger technology, distributed database technology, and/or smart contracts technology may be used in place of and/or in conjunction with blockchain technology for such purpose/feature.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A computer system comprising:
non-transitory storage configured to store data for a plurality of accounts that are associated with at least one cryptographic key, the plurality of accounts including an intermediary account;
at least one hardware processor configured to:
receive match data of a match between a first data transaction request that is associated with a first identifier and a second data transaction request that is associated with a second identifier;
based on reception of the match data:
generate a first blockchain transaction that includes data for a first transaction from the first identifier to an intermediary identifier that is associated with the intermediary account, wherein the data that is included in the first transaction is based on at least one value that is included in the received match data, and
generate a second blockchain transaction that includes data for a second transaction from the intermediary identifier to the second identifier, wherein the data that is included in the second transaction is based on at least one value that is included in the received match data;
communicate the first and second blockchain transactions to a distributed blockchain computer system for incorporation into a blockchain that is maintained by the blockchain computer system; and
generate a blockchain transaction that includes a programmatic structure, the programmatic structure including a timer condition or time condition, which upon satisfaction thereof, is configured to trigger an additional action that is automatically performed.

2. The computer system of claim 1, wherein the at least one hardware processor is further configured to:
generate a third blockchain transaction that includes the match data of the match between the first data transaction request and the second data transaction request; and
communicate the third blockchain transaction to the distributed blockchain computer system to be incorporated into the blockchain.

3. The computer system of claim 2, wherein the third blockchain transaction that includes the match data of the match between the first data transaction request and the second data transaction request is incorporated into the blockchain prior to the incorporation of the first and second blockchain transactions.

4. The computer system of claim 2, wherein the first and/or second blockchain transactions are dependent on the third blockchain transaction.

5. The computer system of claim 2, wherein the third blockchain transaction is structured to be from an identifier that is associated with a computer system that matches data transaction requests to another identifier that is associated with the computer system that received the match data.

6. The computer system of claim 1, wherein the programmatic structure is a smart contract that is embedded into blockchain transactions and is executed by at least one hardware processor of the blockchain computer system based on satisfaction of the timer condition or time condition.

7. The computer system of claim 1, wherein the at least one hardware processor is further configured to:
sign, with a cryptographic key that is associated with a trusted oracle account, an event that is to trigger the timer condition or time condition of the programmatic structure.

8. The computer system of claim 7, wherein the timer condition or time condition is triggerable if and only if an event that satisfies the condition has been signed by the cryptographic key that is associated with the trusted oracle account.

9. The computer system of claim 1, wherein the programmatic structure includes instructions for:
calculating a sum total amount based on all transactions associated with the first identifier that have been included in blockchain transactions for a given time period.

10. The computer system of claim 9, wherein the additional action that is automatically performed includes automatically generating a further blockchain transaction that is from the first identifier to the intermediary identifier or from the intermediary identifier to the first identifier, wherein data included in the further blockchain transaction is based on the calculated sum total amount, wherein the further blockchain transaction is subsequently incorporated into the blockchain.

11. The computer system of claim 1, wherein the additional action that is automatically performed includes generation of at least one new blockchain transaction that is subsequently incorporated into the blockchain, the at least one new blockchain transaction including data that is based on the data for the first transaction included in the first blockchain transaction.

12. A method for interacting with a blockchain, the method comprising:
receiving match data that includes data for a match between a first data transaction request that is associated with a first identifier and a second data transaction request that is associated with a second identifier;
generating, with at least one hardware processor, at least one blockchain transaction that includes:
first data for a first transaction from the first identifier to an intermediary identifier, wherein the first data for the first transaction is at least based on one or more values in the received match data, and
second data for a second transaction that is from the intermediary identifier to the second identifier, wherein the second data for the second transaction is at least based on one or more values in the received match data;
communicating, by using the at least one hardware processor, the at least one blockchain transaction to a blockchain computer system for incorporation into a blockchain that is maintained by the blockchain computer system; and
generating a programmatic structure and include the programmatic structure into at least one generated blockchain transaction, the programmatic structure configured to automatically execute to execute out at least one programmatic action upon expiration of a timer.

13. The method of claim 12, wherein the at least one programmatic action includes:
calculating a sum total amount based on all transactions associated with the first identifier that have been included in blockchain transactions for a given time period, and
automatically generating a further blockchain transaction that is from the first identifier to the intermediary identifier or from the intermediary identifier to the first identifier, wherein data included in the further blockchain transaction is based on the calculated sum total amount, wherein the further blockchain transaction is subsequently incorporated into the blockchain.

14. The method of claim 12, wherein the programmatic structure is a smart contract that is embedded into the at least one generated blockchain transaction and is executed by the at least one hardware processor of the blockchain computer system based on expiration of the timer.

15. The method of claim 12, wherein the match data is stored to the blockchain as part of the at least one blockchain transaction.

16. The method of claim 12, further comprising:
signing, with a cryptographic key that is associated with an oracle account, an event that triggers expiration of the timer,
wherein the timer condition or time condition are triggerable if and only if an event that satisfies the condition has been signed with the cryptographic key of the oracle account.

17. The method of claim 12, wherein the at least one programmatic action includes:
calculating a sum total amount based on all transactions associated with the first identifier that have been included in blockchain transactions for a given time period; and
generating a further blockchain transaction that is from/to the first identifier to/from the intermediary identifier, wherein data included in the further blockchain transaction is based on the calculated sum total amount.

18. A non-transitory computer readable storage medium storing instructions for use with a computer system that includes a transceiver and memory, the computer system configured to communicate with a distributed blockchain computer system that maintains a blockchain, the stored instructions comprising instructions that, when executed, cause the computer system to perform operations comprising:
receiving match data of a match between a first data transaction request that is associated with a first identifier and a second data transaction request that is associated with a second identifier;
generating at least one blockchain transaction that includes data for a first transaction from the first identifier to an intermediary identifier that is associated with an intermediary, wherein the data for the first transaction is based on at least one of the values included with the received match data, wherein the at least one blockchain transaction includes data for a second transaction that is from the intermediary identifier to the second identifier, wherein the data for the second transaction is based on at least one of the values included with the received match data;
communicating the at least one blockchain transaction to the distributed blockchain computer system for incorporation into the blockchain; and
incorporate a programmatic structure into a blockchain transaction that is stored to the blockchain, the programmatic structure configured to be run upon satisfaction of a timer condition or time condition, which, upon satisfaction thereof, is set to automatically execute at least one further programmatic action.

19. The non-transitory computer readable storage medium of claim 18, wherein the at least one blockchain transaction includes a first blockchain transaction and a second blockchain transaction, wherein the first blockchain transaction includes data for first transaction from the first identifier to the intermediary identifier and the second blockchain transaction includes data for the second transaction from the intermediary identifier to the second identifier, the first and second blockchain transactions being separate blockchain transactions that are incorporated into the blockchain.

20. The non-transitory computer readable storage medium of claim 18, wherein the programmatic structure is a smart contract that is embedded into blockchain transactions and is executed by at least one hardware processor of the blockchain computer system based on satisfaction of the timer condition or time condition.

* * * * *